US012384499B1

(12) United States Patent
McGinnis

(10) Patent No.: US 12,384,499 B1
(45) Date of Patent: Aug. 12, 2025

(54) MARINE VESSELS WITH LIGHT SYSTEMS AND METHODS THEREOF WITH USER INPUT DEVICE FOR SELECTIVELY EMITTING LIGHT IN THE STARBOARD AND/OR PORT DIRECTION

(71) Applicant: Brunswick Corporation, Mettawa, IL (US)

(72) Inventor: Kristin M. McGinnis, Cocoa Beach, FL (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 18/735,873

(22) Filed: Jun. 6, 2024

(51) Int. Cl.
*B63B 45/02* (2006.01)
*G05G 9/047* (2006.01)
*H05B 47/175* (2020.01)

(52) U.S. Cl.
CPC ......... *B63B 45/02* (2013.01); *G05G 9/04785* (2013.01); *H05B 47/196* (2024.01)

(58) Field of Classification Search
CPC ..................................................... B63B 45/02
See application file for complete search history.

(56) References Cited

U.S. PATENT DOCUMENTS

| | | | |
|---|---|---|---|
| 5,850,803 A | 12/1998 | Jones et al. | |
| 6,499,867 B1 | 12/2002 | Neal | |
| 7,021,801 B2 * | 4/2006 | Mohacsi | F21V 29/70 362/477 |
| 7,150,664 B1 | 12/2006 | Uppgard et al. | |
| 7,255,616 B1 | 8/2007 | Caldwell | |
| 7,439,902 B2 * | 10/2008 | Robertson | G01S 13/04 342/147 |
| 7,467,595 B1 | 12/2008 | Lanyi et al. | |
| 8,070,333 B2 * | 12/2011 | von Wolske | B63B 45/00 362/477 |
| 9,645,226 B2 * | 5/2017 | Scott | B63B 45/02 |
| 10,308,330 B1 * | 6/2019 | Spivak | F21V 21/15 |

OTHER PUBLICATIONS

"Understanding ADAS: Adaptive Headlights & How They Work" dated Oct. 6, 2021, accessed from https://caradas.com/understanding-adas-adaptive-headlights/ on Jan. 22, 2025.
"Volvo C40 Pixel Headlight Test" dated Mar. 30, 2022, accessed from https://youtu.be/LNv5XHhPIVk?t=97 on Mar. 12, 2025.
"Volvo Electric Vehicles Pixel LED Headlights" dated Apr. 16, 2023, accessed from https://www.youtube.com/watch?v=s0dpgMb_xcl on Mar. 12, 2025.

* cited by examiner

*Primary Examiner* — Robert J May
(74) *Attorney, Agent, or Firm* — Andrus Intellectual Property Law, LLP

(57) ABSTRACT

A marine vessel includes a bow, a stern, a port side, and a starboard side laterally spaced apart from the port side. A light system is coupled to the bow or the stern and operable to emit light in a starboard direction and in a port direction from the bow or the stern. An operator interface device configured to receive an input, and a control system is in communication with the operator interface device and configured to control the light system based on the input such that the light system selectively emits light in the starboard direction and/or the port direction.

20 Claims, 9 Drawing Sheets

MARINE VESSELS WITH LIGHT SYSTEMS AND METHODS THEREOF WITH USER INPUT DEVICE FOR SELECTIVELY EMITTING LIGHT IN THE STARBOARD AND/OR PORT DIRECTION

FIELD

The present disclosure relates to marine vessels, and specifically to marine vessels with light systems.

BACKGROUND

The following U.S. Patent is incorporated herein by reference in entirety.

U.S. Pat. No. 5,850,803 discloses a personal watercraft having a daytime running headlight that illuminates continuously or stroboscopically when the personal watercraft is operating. The daytime running headlight makes the watercraft more noticeable to other boaters. Several embodiments are shown in which one or more daytime running headlights are mounted to the personal watercraft above the deckline of the watercraft and forward of the handlebars of the watercraft.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In certain independent examples, a marine vessel includes a bow, a stern, a port side, and a starboard side laterally spaced apart from the port side. A light system is coupled to the bow or the stern and operable to emit light in a starboard direction and in a port direction from the bow or the stern. An operator interface device configured to receive an input, and a control system is in communication with the operator interface device and configured to control the light system based on the input such that the light system selectively emits light in the starboard direction and/or the port direction.

Optionally a helm is located between the bow and the stern and the operator interface device is located at the helm. Optionally the operator interface device is configured to receive a first input such that the light system emits light in the starboard direction and the operator interface device is configured to receive a second input such that the light system emits light in the port direction. Optionally the operator interface device is a joystick and wherein the first input includes moving the joystick in a first direction and the second input includes moving the joystick in a second direction. Optionally the control system is configured to control the light system based on the input such that the light system selectively emits light in a forward direction or a rear direction. Optionally the light system includes a plurality of lights configured to selectively emit light and a plurality of fins interdigitated with the plurality of lights that are configured to direct the light emitted by the plurality of lights. Optionally the light system includes a frame to which the fins in the plurality of fins are stationarily coupled. Optionally the light system includes a plurality of lights configured to selectively emit light in the starboard direction and/or the port direction, a port navigation light, and a starboard navigation light, and the plurality of lights are spaced apart from each other and/or positioned between the port navigation light and the starboard navigation light. Optionally the light system has a frame to which the plurality of lights, the starboard navigation light, and the port navigation light are coupled. Optionally the light system is located in a pocket at the bow or the stern.

In certain independent examples, a method for operating a marine vessel having a bow, a stern, a port side, and a starboard side includes coupling a light system at the bow with the light system operable to emit light in a starboard direction and in a port direction from the bow, receiving, with an operator interface device, an input, and controlling, with a control system, the light system based on the input such that the light system selectively emits light in the starboard direction and/or the port direction.

Optionally, the input is a first input such that the light system emits light in the starboard direction or a second input such that the light system emits light in the port direction. Optionally, the input is a first input and the method includes emitting light in one of the starboard direction or the port direction, receiving an additional first input via the operator interface device, and increasing light intensity of the light emitting from the light system in the one of the starboard direction or the port direction based on the additional first input. Optionally, the method includes receiving a second input via the operator interface device, decreasing the light intensity of the light emitting from the light system in the one of the starboard direction or the port direction or emitting light in the other of the starboard direction or the port direction based on the second input. Optionally, the method includes receiving an additional second input via the operator interface device and increasing light intensity of the light emitting in the other of the starboard direction or the port direction based on the additional second input. Optionally, the light system has a plurality of starboard lights and a plurality of port lights and the input is a first input and the method including controlling one of the starboard lights to emit light based on the first input, receiving an additional first input via the operator interface device; and controlling another one of the starboard lights to emit light based on the additional first input. Optionally, the method includes receiving a second input via the operator interface device and controlling one of the starboard lights to stop emitting light therefrom or emitting light from one of the port lights. Optionally, the method includes receiving an additional second input via the operator interface device and controlling another one of the starboard lights to stop emitting light or emitting light from another one of the port lights. Optionally, the light system has a centerline, a plurality of starboard lights each laterally spaced apart from each other in a starboard direction from the centerline, and a plurality of port lights each laterally spaced apart from each other on a port direction from the centerline and the input is a first input, and the method includes controlling a first starboard light of the plurality of starboard lights to emit light therefrom, receiving an additional first input via the operator interface device, controlling the first starboard light to stop emitting light and a second starboard light to emit light therefrom, and the second starboard light is spaced apart in the starboard direction from the centerline more than the first starboard light. Optionally, the method includes receiving a second input via the operator interface device and controlling the second starboard light to stop emitting light and the first starboard light emits light or emitting light from a first port light in the plurality of port lights emits light. Optionally, the method includes receiving an additional second input via the operator interface device and controlling the first starboard light to stop emitting light or emitting light from one of the first port light in the plurality of port lights based on the additional second input.

In certain independent examples, a marine vessel includes a bow, a stern, a port side, and a starboard side laterally spaced apart from the port side. A light system is coupled to the bow and configured to selectively emit light in a starboard direction and/or a port direction from the bow. An operator interface device is configured to receive an input. A control system is in communication with the operator interface device and configured to control the light system based on the input such that the light system emits light in the starboard direction and/or the port direction.

In certain independent examples, a method for operating a marine vessel having a bow, a stern, a port side, and a starboard side includes coupling a light system at the bow that is configured to selectively emit light, receiving, with an operator interface device, an input, and controlling, with a control system, the light system based on the input such that the light system emits light in a starboard direction and/or a port direction from the bow.

Various other features, objects, and advantages will be made apparent from the following description taken together with the drawings.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
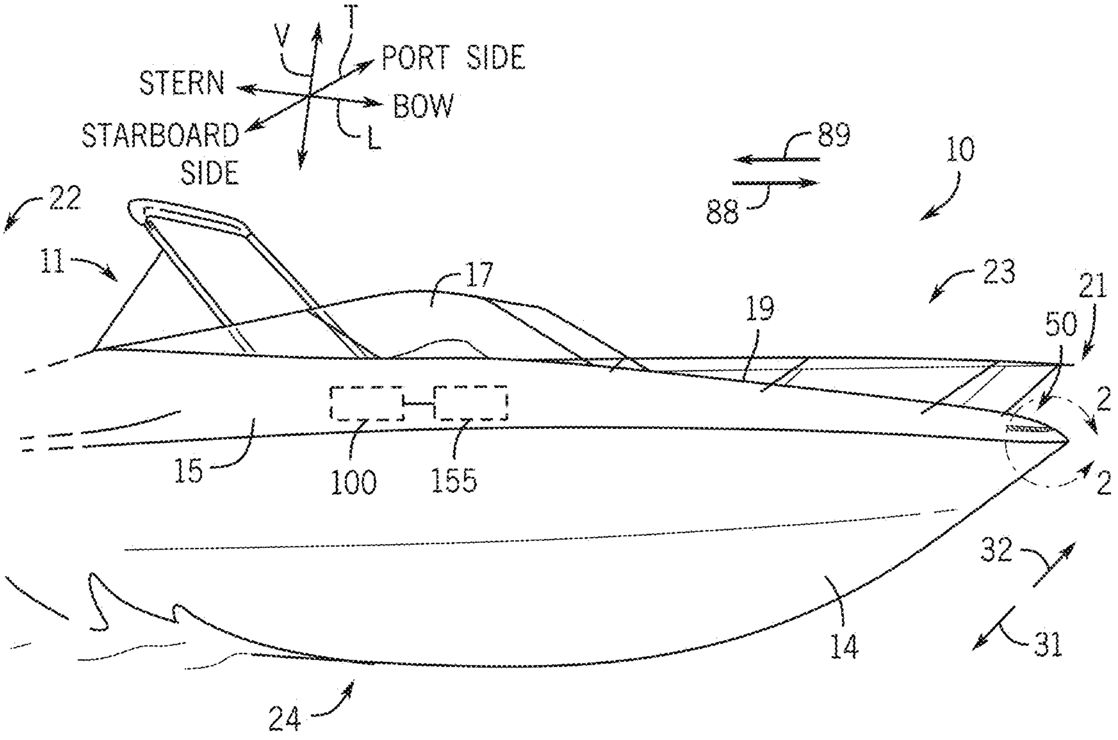
FIG. 1 is a perspective view of an example marine vessel according the present disclosure.

FIG. 1 depicts an example marine vessel 10 according to the present disclosure. The marine vessel 10 longitudinally extends between a bow 21 and a stern 22 (see example longitudinal axis L and longitudinal centerline 26 of the marine vessel 10) and laterally extends between a port side 23 and a starboard side 24 (see example lateral axis T which is perpendicular to the longitudinal axis L). Note that the lateral axis T and the longitudinal axis L are each also perpendicular to an example axis V, which in certain examples is a vertical axis. The type of marine vessel 10 can vary such as a dual-console boat, a yacht, a fishing boat, a hardtop boat, ski/speed boat, multi-hull boats, catamaran hulls, and the like.

The marine vessel 10 includes a deck (not depicted) on which components of the marine vessel 10 can be placed and the operator stands. The deck is coupled to a hull 14 to generally form the marine vessel 10. The deck and the hull 14 can be formed of fiberglass, and in some examples, the deck and/or the hull 14 form a sidewall 15 that at least partially extends along the perimeter of the marine vessel 10. The sidewall 15 has a gunwale 19, and a windshield 17 is attached to the gunwale 19 and/or a console (not depicted). The windshield 17 is angled inwardly toward the center of the marine vessel 10. A helm 11 is located on the deck between the and facilitates operational control of the marine vessel 10 by the operator.

The marine vessel is configured to move within a body of water in a direction instructed by an operator via a steering control system, or by a guidance system configured to automatically control steering of the marine vessel to steer the vessel toward a predetermined location or global position. The marine vessel 1 may be steered in a conventional manner, such as by controlling a marine drive or a rudder via a steering actuator. Additional information regarding exemplary steering actuators is provided in U.S. Pat. Nos. 7,150,664; 7,255,616; and 7,467,595, which are incorporated by reference herein in their entireties.

Figure 4:
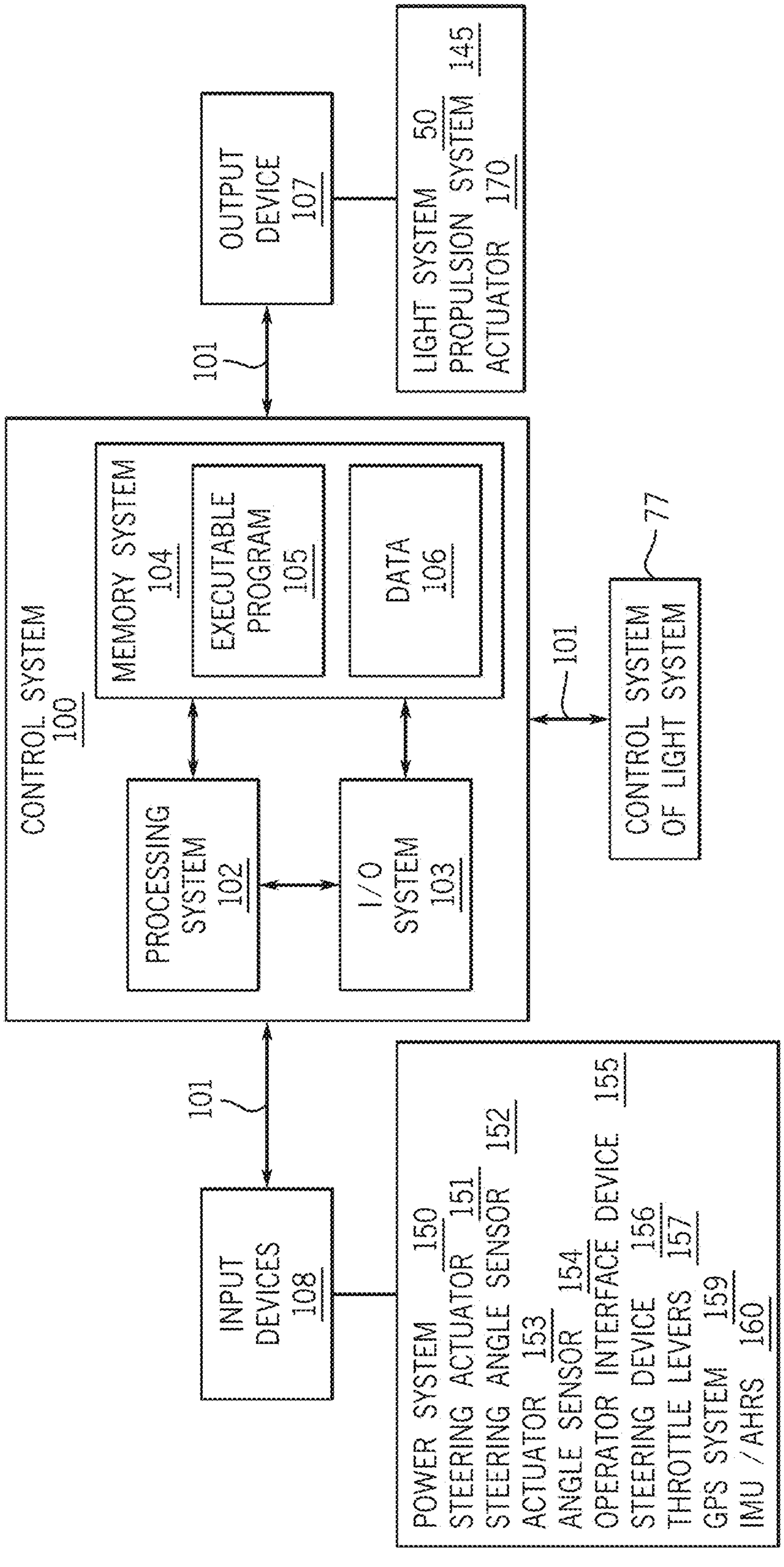
FIG. 4 is a schematic diagram of an example control system according to the present disclosure.

The marine vessel 10 is propelled through a body of water by a marine propulsion system 145 (FIG. 4) having one or more marine drives (not depicted) such as outboard motors, inboard motors, stern drives, pod drives, and/or jet drives. The propulsion system can also include sails, oars, pedals, and/or other mechanisms.

The marine drives are connected to a power system 150 that receives energy from one or more energy sources. In the case of a gasoline powered marine drive, the energy is gasoline and the energy source is a fuel tank fluidly connected to the gasoline powered marine drive in a conventional manner. In the case of an electric marine drive, the energy is electrical power supplied from a power storage system. The power storage system stores electrical energy for powering a light system 50 (described herein below), the electric motor, and/or other electrical devices associated with the marine vessel 10 (e.g., HVAC systems, water pumps). The power storage system may be a battery system including one or more batteries or banks of batteries. For example, the power storage system may include one or more lithium-ion (LI) battery cells, lead-acid batteries, fuel cells, flow batteries, ultracapacitors, and/or other devices capable of storing and outputting electric energy.

The marine vessel 10 also includes a light system 50 according to the present disclosure for emitting light to illuminate areas located outside and around the marine vessel 10. The present inventor recognized that illuminating areas around marine vessels may be important for several reasons. For example, when operating a marine vessel during dusk, dawn, and/or night, it may be necessary to illuminate areas around the marine vessel to ensure safe navigation, visualize channel markers, and/or avoid hazards in the water and/or communicate with other marine vessels and persons (e.g., communicate distress situations such as SOS, locate members in a group excursion).

The present inventor also recognized that conventional lights and/or lighting systems have problems and limitations when attempting to illuminate areas around the marine vessel. For example, some conventional marine vessels have spotlights which are hardtop-mounted or windshield-mounted and manually operated by the operator to illuminate different areas around the marine vessel. These example conventional spotlights may disadvantageously require manual operation thereby requiring the operator remove their hand(s) from other control devices (e.g., steering wheel, throttle lever) and/or may be limited in amount and/or range of illumination provided due to size constraints (e.g., the conventional spotlights cannot be so large so as to obstruct the operator's vision). Furthermore, conventional spotlights mounted on structures on the marine vessel (e.g., hardtops, towers) emit light that may be reflected by other parts of the marine vessel (e.g., the windshield, stainless steel trim pieces) back at the operator thereby reducing the amount of light directed to the area to be illuminated, decreasing the vision of the operator, and/or temporarily blinding the operator.

The present inventor also recognized that conventional lights and/or lighting system may disadvantageously emit light in several areas around the marine vessel including the areas the operator wishes to illuminate and areas the operator may not wish to illuminate. Not being able to control the areas which are illuminated by conventional lights or lighting systems increases the amount of energy consumed by the conventional lights or lighting systems thereby decreasing power efficiency and/or effectiveness which can be especially important on marine vessels which are electrically powered without internal combustion engines or drives.

As such, the present inventors developed the light systems 50 of the present disclosure which are new, solve problems of conventional light systems, and include improvements over conventional lights and light systems.

The light system 50 is configured to emit light to thereby illuminate areas around the marine vessel 10 by emitting light in different directions based on one or more inputs received from the operator via an operator interface device 155 (described further herein). Example operations of the light system 50 are described in greater detail herein below.

The light system 50 is positioned at the bow 21, and accordingly, the light emitted by the light system 50 is not reflected back toward the operator by components (e.g., railings) of the marine vessel 10. The light system 50 is located at the bow 21 such that the lighting system 50 can emit light one or more directions (described further herein).

Note that the light system 50 can be position at any location on the marine vessel 10 to thereby avoid the disadvantages or problems described above with respect to conventional lights. For example, the example light systems 50 described herein are generally described as positioned forward of the helm 11 at the bow 21, the light system 50 could be positioned at the stern 22. In these examples, the light system 50 positioned at the stern 22 could be positioned such that the light emitted by the light system 50 is not reflected back toward the operator by components (e.g., railings, powerhead of the motor) of the marine vessel 10. It should be understood that the light system 50 positioned at the stern 22 can include any of the features or components described herein with respect to the light system 50 positioned at the bow 21 and that any directional features described with respect to the light system 50 at the bow 21 may be mirrored, reversed, or inverted for a light system 50 positioned at the stern 22. For instance, while the light system 50 positioned at the bow 21 could be configured to emit light in a longitudinal or forward direction (see arrow 88 on FIG. 1) away from the bow 21, a light system 50 positioned at the stern 22 could be configured to emit light in a rear direction (see arrow 89 on FIG. 1) away from the stern 22.

Figure 2:
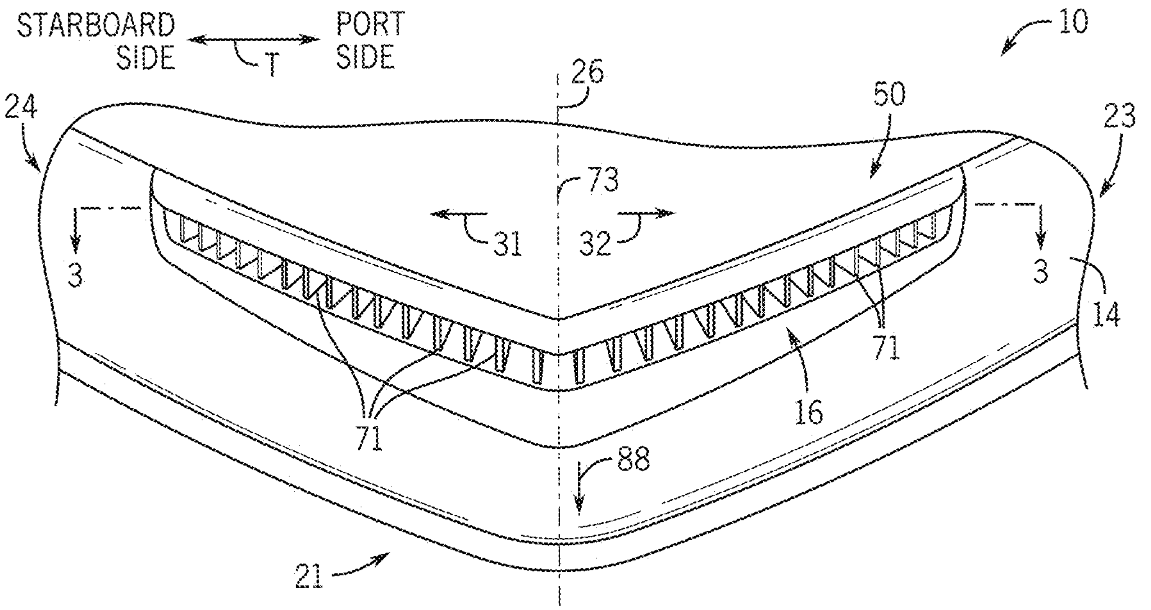
FIG. 2 is an enlarged view of an example light system according to the present disclosure at line 2-2 on FIG. 1.

In the example depicted in FIGS. 1-2, the light system 50 is recessed in a pocket 16 defined by the hull 14 at the bow 21. In other examples, the light system 50 can be surface mounted to or recessed to the hull 14, the sidewall 15, and/or the gunwale 19.

Figure 3:
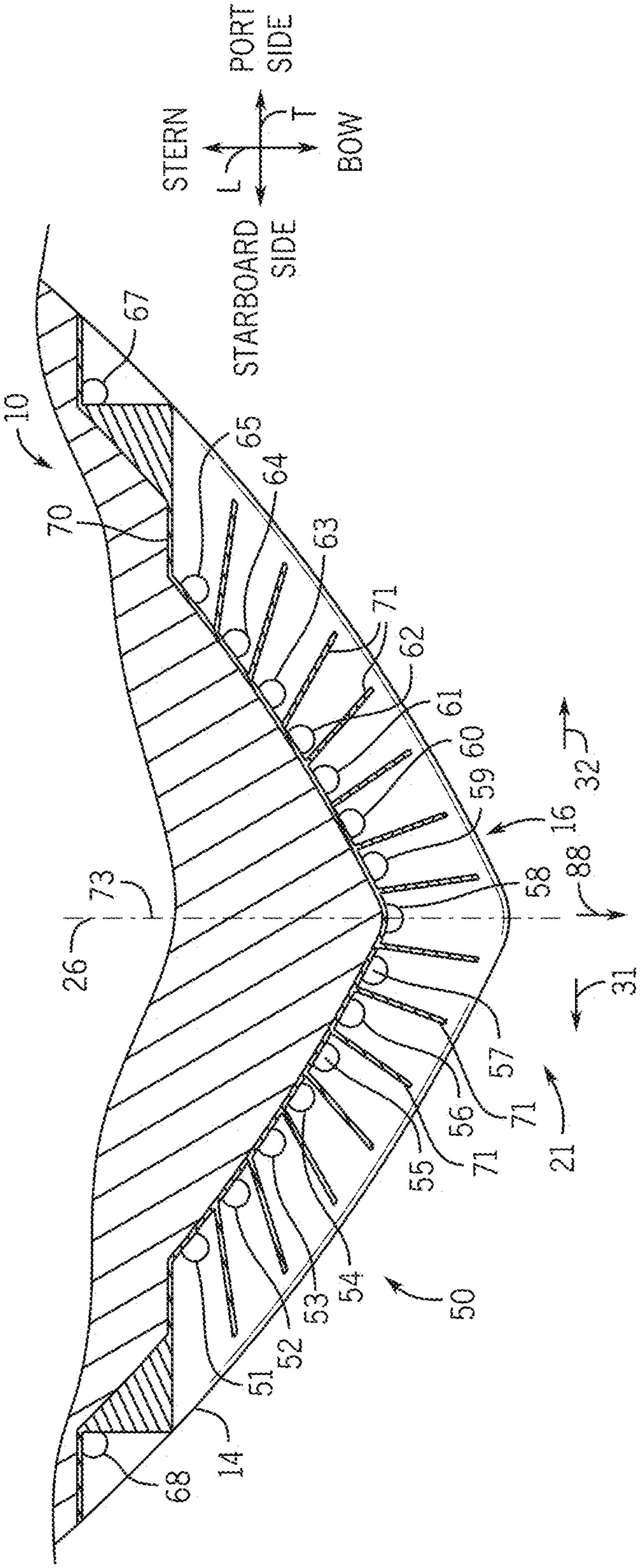
FIG. 3 is a schematic cross-sectional view of the example light system depicted in FIG. 3.

Referring now to FIG. 3, an example light system 50 of the present disclosure is depicted in greater detail. The light system 50 includes a plurality of lights 51-65 which are each configured to emit light. The lights 51-65 can be any suitable device for emitting light, such as incandescent bulbs, light emitting diodes (LEDs), florescent lights, halogen lights, and/or the like. The lights 51-65 are configured to emit light in one or more directions. For instance, a center light 58 is configured to emit light in a generally forward direction from the bow 21, starboard lights 51-57 are configured to emit light in a generally starboard direction, and port lights 59-65 are configured to emit light in a generally port direction. In certain examples, the lights 51-65 are mounted to a frame 70. The lights 51-65 are spaced apart from each other in a suitable pattern such that the light system 50 can emit light in multiple directions. In other examples, the lights 51-65 are separated into more than one grouping of lights with gaps or voids between the groupings (e.g., the starboard lights 51-57 and a center light 58 are on the same frame 70 and there is a gap are between the starboard lights 51-57 and the center light 58) or the groupings of lights are separated from the other grouping of lights (e.g., the starboard lights 51-57 is on a first frame separated and spaced apart from the port lights 59-65 which are one a second frame and the center light 58 is spaced apart and between the starboard lights 51-57 and the port lights 59-65). In certain examples, the frame 70 is coupled to the hull 14, the deck, and/or the sidewall 15. In certain examples, the lights 51-65 are capable of emitting different amounts light therefrom (e.g., the center light 58 may emit 25% of the maximum amount of light the center light 58 is capable of emitting) such that the light intensity of the light emitting from the light, the light system 50, or a portion of the light system can vary. In certain examples, the light system 50 includes a vertically stacked plurality of lights.

In certain examples, fins 71 are positioned between adjacent lights 51-65 and are configured to focus and/or direct light emitted from a light 51-65 located between two fins 71 in a specific direction. In certain examples, the fins 71 are coupled to the frame 70 such that the fins 71 do not move relative to each other and/or are stationary. In other examples, the fins 71 are each movable (e.g., pivotable) about an axis such that the fins 71 can independently move or move together to direct light emitted by the lights 51-65 in various directions. The fins 71 are moved by one or more actuators 170 (see FIG. 4; e.g., linear actuators, pneumatic or hydraulic cylinders). In certain examples, the plurality of fins 71 are interdigitated with the plurality of lights 51-65 such that the fins 71 direct, focus, and/or concentrate the light emitted by the lights 51-65 in various directions. In certain examples, the light system 50 includes a reflector (not depicted) that is movable to direct and/or concentrate light emitting for one or more of the lights 51-65.

The fins 71, the frame 70, and/or the hull 14 can be coated with a reflective material that reflects the light away from the marine vessel 10. In certain examples, a lens (not depicted) is included at front of the light system 50 to diffuse the light and/or prevent light 'hot spots' as the light is emitted through the lens. The lens would also protect the lights 51-65 from debris and/or moisture.

Figure 5:
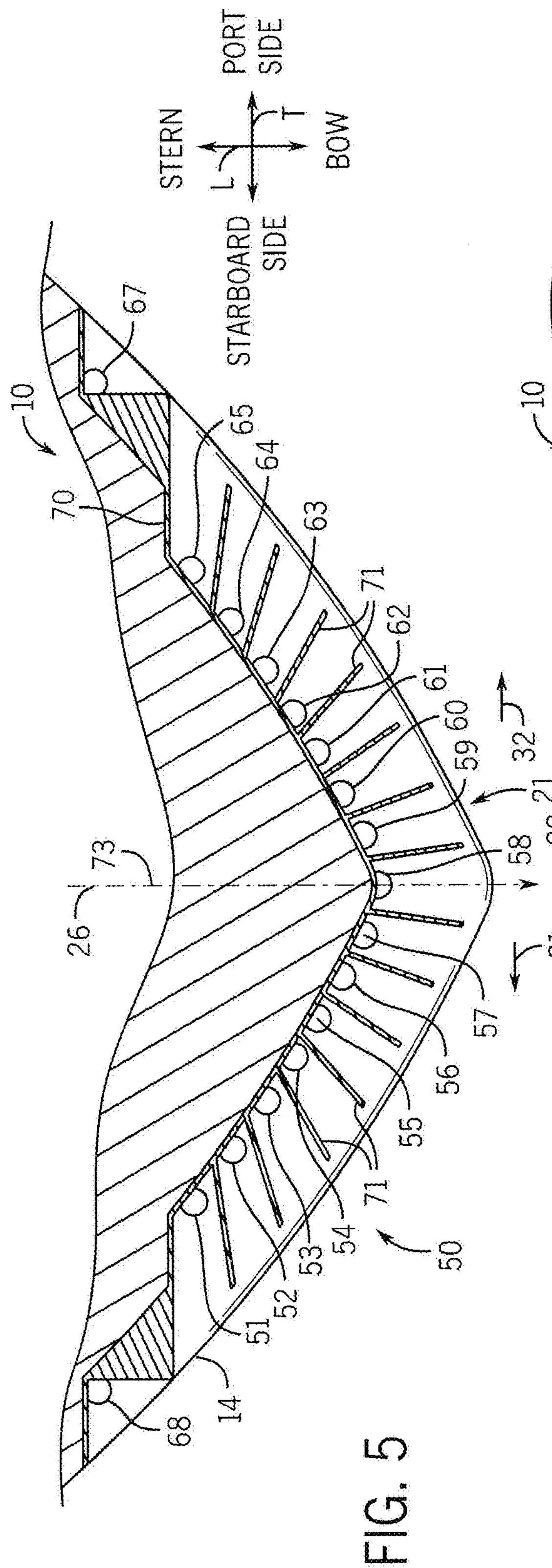
FIG. 5 is a view like FIG. 3 with the light system in a first operational mode.

In certain examples, the light system 50 includes a centerline 73 and a center light 58 is located on the centerline 73. In certain instances, the centerline 73 of the light system 50 is aligned on the centerline 26 of the marine vessel 10. The center light 58 The other lights 51-57, 59-65 are spaced apart from the centerline 73 in either a starboard direction 31 that generally extends away from the centerline 73 toward the starboard side 24 or a port direction 32 that generally extends away from the centerline 73 toward the port side 23. The lights 51-57 that are located in the starboard direction 31 from the center light 58 can be referred to as starboard lights 51-57 herein, and the lights 59-65 that are located in the port direction 32 from the center light 58 can be referred to as port lights 59-65 herein. The lights 51-58 can form an arch shape, as depicted in FIG. 5. Note that in other examples the center light 58 may be excluded such that the lights 57, 59 would operate together to direct light in the forward direction 88.

The light system 50 can optionally include navigation lights such as a port navigation light 67 and a starboard navigation light 68. The port navigation light 67 emits red light and is oriented in a direction away from the port side 23, and the starboard navigation light 68 emits green light and is oriented in a direction toward the starboard side 24. In certain examples, the lights 51-65 are positioned between the navigation lights 67, 68. The navigation lights 67, 68 may conform to government regulations set forth by the US Coast Guard such as ABYC standards.

The light system 50 is in communication with a control system 100 (see FIG. 4) of the marine vessel 10 that is configured to control the operation of various components and/or systems of the marine vessel 10 including the light system 50 (described further herein). Note that in other examples, the light system 50 includes its own control system 77 that is independent from the control system 100 of the marine vessel 10 and/or communicates with the control system 100 of the marine vessel 10. In these examples, the control system of the light system 50 can include any of the features and/or components of the control system 100 described herein. In certain examples, the light system 50 can be retrofitted onto an existing marine vessel such as mounted to the hull or deck or integrated onto a forward side bow rail.

The control system 100 is in communication with the power system 150 such that the control system 100 can selectively direct power from the power system 150 to the light system 50. The control system 100 is also in communication with one or more operator interface devices 155 which are configured to display information for the operator, as well as to receive input commands relating to steering, thrust, lighting, and/or other functions of the marine vessel 10. This includes the programming of destinations and waypoints for autopiloting. In one non-limiting example, the operator interface devices 155 may be a multi-functional display device permitting touch-screen inputs from the user. The operator interface devices 155 can include display screens, touchscreens, speakers, buzzers, visual indicators, vibration devices, keyboards, trackpads, roller balls, joysticks, dials, switches, toggles, voice-command receiving devices, gesture sensing control devices, and/or the like. In certain examples, the operator interface devices 155 may be, for example, part of an onboard management system, such as the VesselView™ by Mercury Marine of Fond du Lac, Wisconsin. The operator interface device 155 can be located at any location on the marine vessel 10. In certain examples, the operator interface device 155 is located at the helm 11 (FIG. 1). In other examples, the operator interface device 155 is capable to sensing operator gestures (e.g., head turns toward or way from the port side or the starboard side or points in a certain direction) which are interpreted by the control system 100 as operator inputs. In these examples, the control system 100 automatically adjusts operation of the light system 50 (e.g., lights are illuminated in the direction the operator's head turns or the direction in which the operator pointed). In certain examples, the marine vessel 10 includes more than one operator interface device 155 that can receive inputs from the operator at different locations on the marine vessel 10.

Additionally or alternatively, the operator interface device 155 is an external device, such as a personal tablet, remote control, or cellular smartphone, which wirelessly communicates with the control system 100, via wireless protocols known in the art (e.g., cellular data network, Wi-Fi, or Bluetooth®). The user interface device 155 may have a processing system, memory system, and/or input/output (I/O) system in the same manner as other control systems 100 described herein. The processing system may be configured to execute an application stored in the memory system that enables the operator to receive information from the control system 100 relating to the marine vessel 10 more generally and to provide input commands to the control system 100 for controlling the marine vessel 10. By way of example, the external device may be configured to operate an application such as the "Mercury Marine" App or the VesselView™ Mobile App each provided by Mercury Marine of Fond du Lac, Wisconsin. In each case, the applications allow the operator to receive information and to provide input commands via the external device. In this manner, the external device may also constitute a control system within the control system 100.

The control system 100 is in communication with other component and/or systems of the marine vessel 10 such as propulsion control modules (PCM), motor controllers, trim controllers, steering controllers, and/or the like. A person of ordinary skill in the art will understand in view of the present disclosure that other control arrangements could be implemented and are within the scope of the present disclosure, and that the control functions described herein may be combined into a single control system or divided into any number of a plurality of distributed control systems that are communicatively connected. In certain embodiments.

Certain examples of the present disclosure are described or depicted as functional and/or logical block components or processing steps, which may be performed by any number of hardware, software, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

In certain examples, the control system 100 communicates with each of the one or more system and/or components of the marine vessel 10, such as the power system 150 and/or the light system 50, via a communication links 101, which can be any wired or wireless link. The control system 100 is capable of receiving information and/or controlling one or more operational characteristics of the and its various sub-systems by sending and receiving control signals via the communication links 101. In one example, the communication link 101 is a controller area network (CAN) bus; however, other types of links could be used. It will be recognized that the extent of connections and the communication links 101 may in fact be one or more shared connections, or links, among some or all of the components of the marine vessel 10. Moreover, the communication link 101 lines are meant only to demonstrate that the various control elements are capable of communicating with one another, and do not represent actual wiring connections between the various elements, nor do they represent the only paths of communication between the elements. Additionally, the power system 150 and/or the light system 50 may incorporate various types of communication devices and systems, and thus the illustrated communication links 101 may in fact represent various different types of wireless and/or wired data communication systems.

The control system 100 may be a computing system that includes a processing system 102, memory system 104, and input/output (I/O) system 103 for communicating with other devices, such as input devices 108 (e.g., operator interface device 155) and output devices 107 (e.g., lighting system 50). The processing system 102 loads and executes an executable program 105 from the memory system 104, accesses data 106 stored within the memory system 104, and directs the power system 150 and/or the lighting system 50, and the marine vessel 10 generally to operate as described in further detail below.

The processing system 102 may be implemented as a single microprocessor or other circuitry or be distributed across multiple processing devices or sub-systems that cooperate to execute the executable program 105 from the memory system 104. Non-limiting examples of the processing system include general purpose central processing units, application specific processors, and logic devices.

The memory system 104 may comprise any storage media readable by the processing system 102 and capable of storing the executable program 105 and/or data 106. The memory system 104 may be implemented as a single storage device or be distributed across multiple storage devices or sub-systems that cooperate to store computer readable instructions, data structures, program modules, or other data. The memory system 104 may include volatile and/or non-volatile systems and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

The light system 50 can be operated by the operator in various manners, and several example operational modes and methods of operation are described herein below. Note that certain steps or features of each example operational mode and/or example method described herein below can be combined with other example operational modes and/or example methods described herein.

FIG. 5 depicts the light system 50 in a first operational mode in which center light 58 emits light (depicted schematically as dash-dot lines) in a forward direction 88 along the centerline 26 from the bow 21 to thereby illuminate the area in front of the bow 21. In certain examples, that the center light 58 is oriented in the forward direction 88. The light system 50 in the first operational mode is advantageously utilized when the operator is driving the marine vessel and/or looking in the forward direction 88.

The light system 50 can be moved to the first operational state by in various manners. The light system 50 can be moved into the first operational mode by turning the light system 50 'on' or 'off' by entering corresponding inputs into the operator interface device 155. For instance, the operator may engage a physical or soft switch to selectively allow power from a power source to energize the light system 50. In another instance, the operator may engage a 'power' icon on the touchscreen panel to move the light system 50 into the first operational mode or power off the light system 50.

In another example, a daylight sensor (not depicted) senses daylight levels, which are received by the control system 100 to determine whether the measured values are below a predetermined threshold. The control system 100 then sends corresponding command signals to the light system 50 to thereby move the light system 50 into the first operational state. In another example, the operator entered an input into the operator interface device 155 such that the control system 100 controls the light system 50 into the first operational state.

However, there may be situations in which light needs to be directed in other directions. For instance, the operator may laterally look over the port side 23 or the starboard side 24 at the shoreline or other marine vessels. The operator may also laterally look over port side 23 or the starboard side 24 while turning the marine vessel 10. As such, the light system 50 can include additional operational modes for emitting light in operator-preferred directions.

Figure 6:
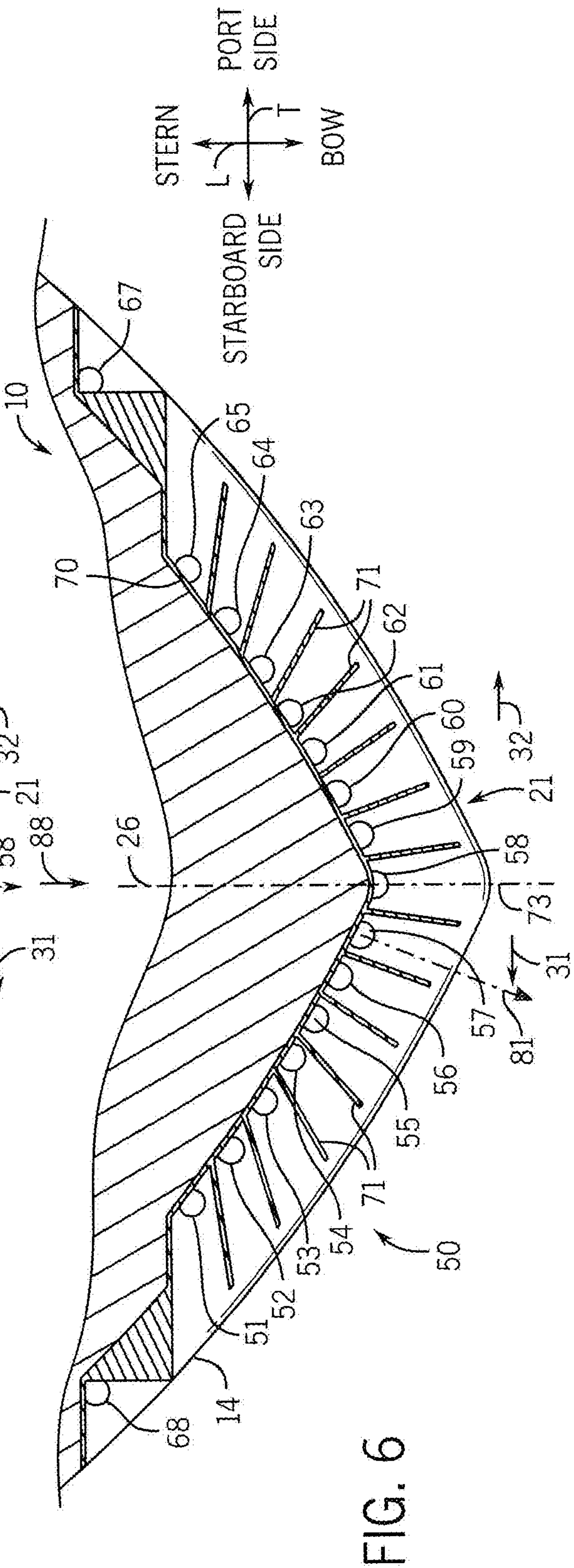
FIG. 6 is a view like FIG. 3 with the light system in a second operational mode.

FIG. 6 depicts the light system 50 in a second operational mode in which the light system 50 emits light (see dash-dot-line 81) at least partially in the starboard direction 31. At least one of the starboard lights 51-57, for instance, the first starboard light 57, illuminates the area located along the starboard side 24 of the marine vessel 10. In certain examples, only one of the starboard light 51-57 emits light when the light system 50 is in the second operational mode, however, in other examples, more than one starboard light 51-57 emits light when the light system 50 is in the second operational mode. In certain examples, each starboard light 51-57 is oriented in the starboard direction.

The light system 50 can be moved to the second operational mode by entering an input, such as a first input, via the operator interface device 155. The control system 100 is in communication with the operator interface device 155 and is configured to control the light system 50 such that the light system 50 is moved to the second operational mode and/or emits light in the starboard direction 31.

Figure 7:
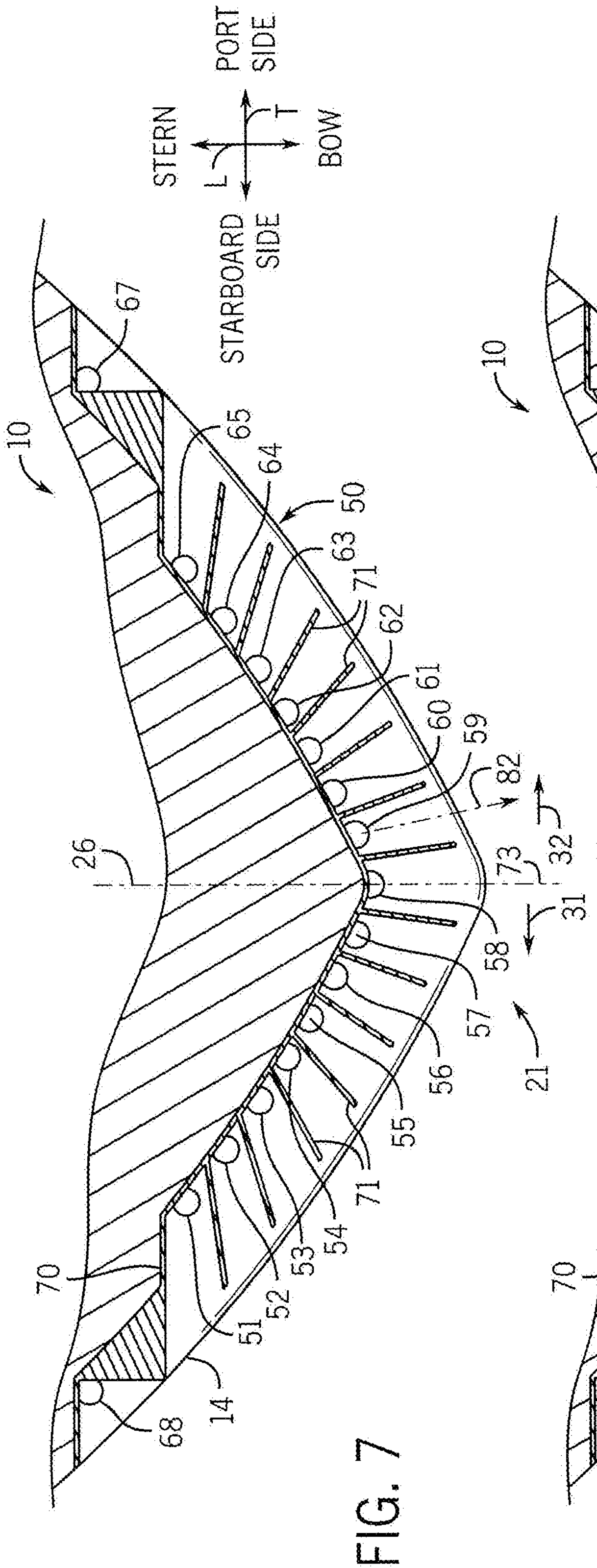
FIG. 7 is a view like FIG. 3 with the light system in a third operational mode.

FIG. 7 depicts the light system 50 in a third operational mode in which the light system 50 emits light (see dash-dot-line 82) in at least partially the port direction 32. At least one of the port lights 59-65, for instance the first port light 59 illuminates the area located along the port side 23 of the marine vessel 10. In certain examples, only one of the port light 59-65 emits light when the light system 50 is in the third operational mode, however, in other examples, more than one port light 59-65 emits light when the light system 50 is in the third operational mode. In certain examples, each starboard light 51-57 is oriented in the starboard direction.

The light system 50 can be moved to the third operational mode by entering an input, such as a second input that is different than the first input, via the operator interface device 155. The control system 100 is in communication with the operator interface device 155 and is configured to control the light system 50 such that the light system 50 is moved to the third operational mode and/or emit light in the port direction 32.

Figure 8:
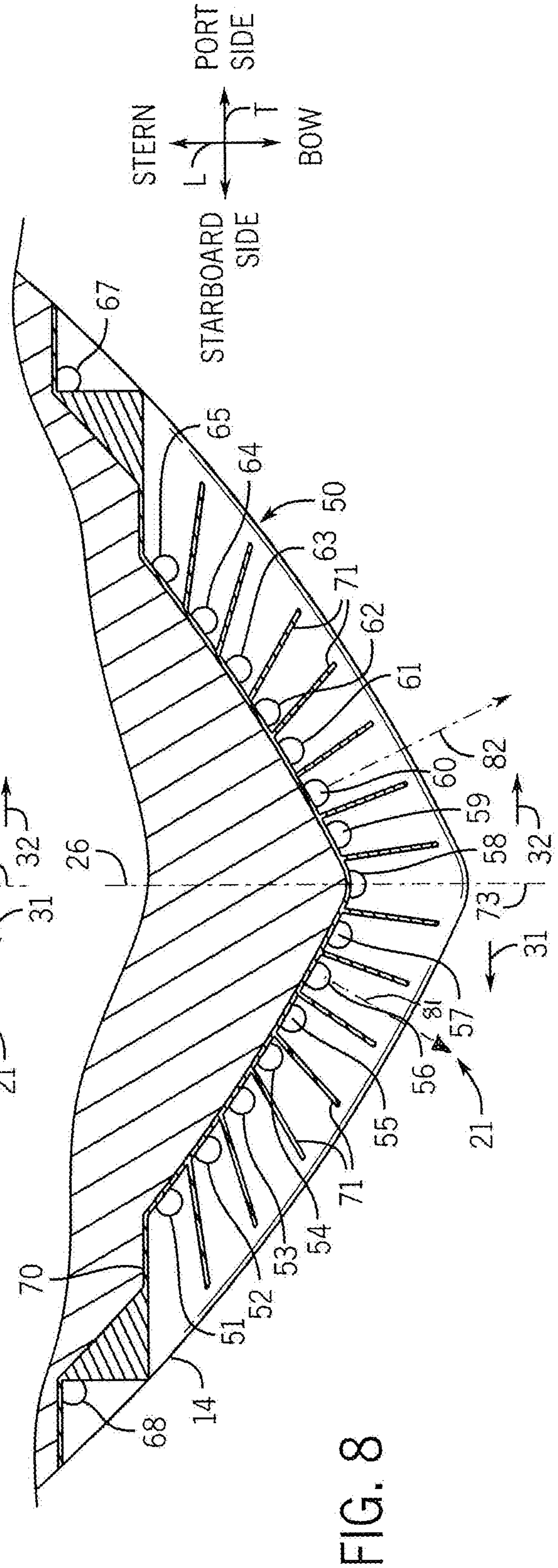
FIG. 8 is a view like FIG. 3 with the light system in a fourth operational mode.

FIG. 8 depicts the light system 50 in a fourth operational mode in which the light system 50 emits light (see dash-dot lines 81, 82) at least partially in both the starboard direction 31 and the port direction 32. At least one of the starboard lights 51-59 and at least one of the port lights 59-65, for instance the second starboard light 56 and the second port light 60 emit light to illuminate the areas located along the starboard side 24 and the port side 23 of the marine vessel 10. In certain examples, only one of the starboard lights 51-57 and only one of the port lights 59-65 emit light when the light system 50 is in the fourth operational mode, however, in other examples, more than one starboard light 51-57 and more than one port light 59-65 emit light when the light system 50 is in the fourth operational mode.

Note that in certain examples the number of the starboard lights 51-57 and/or the port lights 59-65 that emit light can vary (e.g., four starboard lights 51-53 emit light and three port lights 63-65 emit light based on the inputs (e.g., multiple first inputs and multiple second inputs) received via the operator interface device 155). In certain examples, the providing additional first inputs via the operator interface device 155 different and/or an increased number of starboard lights 51-57 to emit light independently of the second inputs received via the operator interface device 155. In certain examples, the providing additional second inputs via the operator interface device 155 different and/or an increased number of port lights 59-65 to emit light independently of the first inputs received via the operator interface device 155.

The light system 50 can be moved to the fourth operational mode by entering inputs into the operator interface device 155 such that the control system 100 controls the light system 50 to move the light system 50 to the fourth operational mode.

Note that in the examples depicted in FIGS. 6-8, the center light 58 is depicted not emitting light when the light system 50 is in the second, third, or fourth operational mode. However, in other examples the center light 58 does emit light in the forward direction 88 when the light system 50 is in the second, third, or fourth operational mode. In certain examples, the center light 58 and one or more starboard light 51-57 and/or one or more port lights 59-65 emit light.

Note that the type of first input and/or second input can vary depending on the operator interface device 155. For example, in embodiments in which the operator interface device 155 is moveable in different directions (physically, via touch screen, etc.) the first input can be moving the operator interface device 155 into a first position or in a first direction and the second input can be moving the operator interface device 155 into a second position or in a second direction different than the first position and first direction, respectively. In instances of the operator interface device 155 including a toggle switch, the control system 100 recognizes signals corresponding to the toggle switch being pivoted into a first toggle position (e.g., the toggle switch is pivoted toward the starboard side 24) as the first input and the signals corresponding to the toggle switch is pivoted into a second toggle position (e.g., the toggle switch is pivoted toward the port side 23) as the second input. It should therefore be recognized that the first and second inputs do not necessarily indicate a sequence in which inputs are provided, but rather that these inputs are two different inputs that can be provided. In the instance of the operator interface device 155 including a dial, the control system 100 recognizes signals corresponding to the dial rotated in a clockwise direction as the first input and signals corresponding to the dial rotated in a counter-clockwise direction as a second input. Further inputs may be defined as a function of how far the dial is rotated in either direction. For example, a plurality of inputs may correspond to each 1 degree rotation of the dial in the clockwise direction, as well as each 1 degree rotation of the dial in the counter-clockwise direction. In instances of the operator interface device 155 including a joystick, the control system 100 recognizes signals corresponding to the joystick pivoted in a first joystick direction (e.g., the joystick is pivoted toward the starboard side 24) as the first input and signals corresponding to the joystick pivoted in a second joystick direction (e.g., the joystick is pivoted toward the port side 23) as the second input.

In other examples, the first input is received via an operator interface device 155 having a touchscreen panel (e.g., capacitive touch sensors). For instance, the operator engages the touchscreen panel with their finger to select an indicia (e.g., a virtual "+" symbol) displayed on the panel. The operator interface device 155 relays a corresponding signal to the control system 100 which thereby controls the light system 50 accordingly.

In other examples, the first input is received via an operator interface device 155 capable of sensing operator gestures (e.g., head turns toward or way from the port side or the starboard side or points in a certain direction) and/or verbal commands from the operator. In other examples, the control system 100 is capable of sensing hazards to navigation (e.g., other marine vessel, docks, buoys, tree branches, persons in the water) via one or more sensors (e.g., photo eyes, infrared sensors, lasers, cameras) and further control the light system 50 to automatically emit light toward these hazards. The control system 100 may also track the location of these hazards and thereby adjust the lights that emit light toward the hazard as the marine vessel 10 moves. The control system 100 can be configured to control the light system 50 to emit light in more than one direction as necessary (e.g., the light system 50 emits light in the direction of the next waypoint or point of interest and also emits light in the direction of any hazards that the marine vessel 10 may come upon while moving).

FIG. 9-12 depict methods 900, 1000, 1100, 1200 for operating the marine vessel 10 and/or the light system 50. The methods 900, 1000, 1100, 1200 may include various steps or features that may alter or modify the operational modes described above. Note that any components noted or described in the methods 900, 1000, 1100, 1200 are depicted in one or more of FIGS. 5-7.

Figure 9:
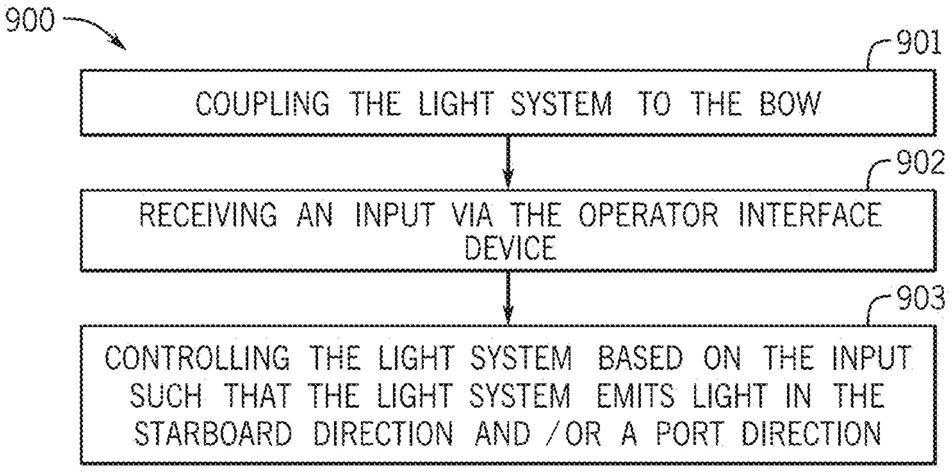
FIGS. 9-12 depict different methods for operating the marine vessels and the light systems of the present disclosure.

Referring specifically to FIG. 9, an example method 900 according to the present disclosure for operating the marine vessel 10 and/or the light system 50 depicted.

The method 900 includes at step 901 coupling the coupling the light system 50 to the bow 21. The operator interface device 155 receives an input from the operator at step 902. At step 903, the control system 100 controls the light system 50 based on the input such that the light system 50 selectively emits light in the starboard direction 31 and/or a port direction 32 from the bow 21. In one example, when the input is a first input, light system 50 emits light in the starboard direction 31 (see for example FIG. 6) or when the input is a second input, the light system 50 emits light in the port direction 32 (see for example FIG. 7).

Figure 10:
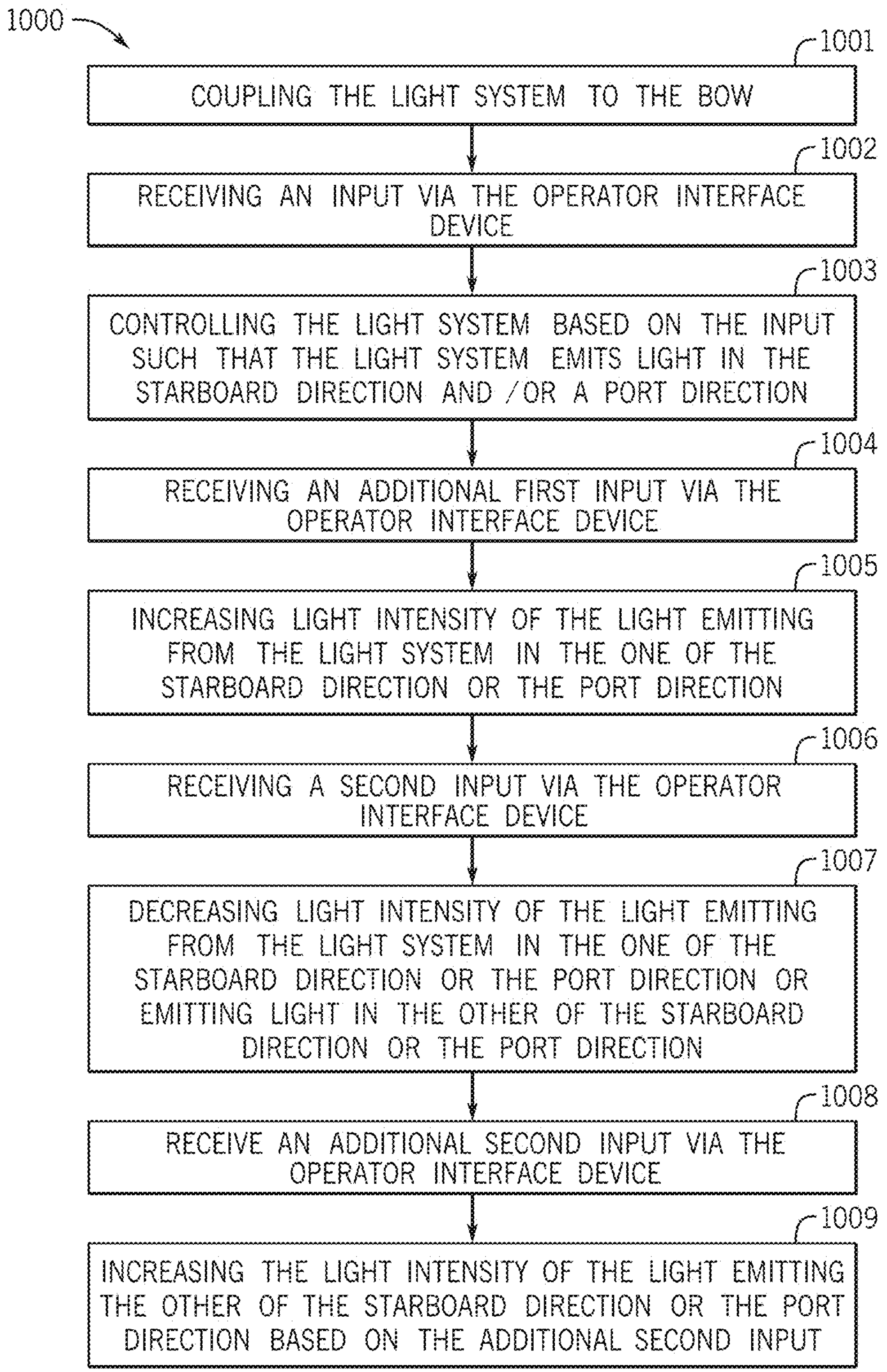

FIG. 10 depicts another example method 1000 according to the present disclosure for operating the marine vessel 10 and/or the light system 50. The method 1000 includes at step 1001 coupling the coupling the light system 50 to the bow 21. The operator interface device 155 receives a first input from the operator at step 1002. At step 1003, the control system 100 controls the light system 50 based on the input such that the light system 50 emits light in the starboard direction 31 or a port direction 32 from the bow 21. An additional first input is received via the operator interface device 155, at step 1004, and at step 1005, the control system 100 increases increasing light intensity of the light emitting from the light system 50 in the one of the starboard direction or the port direction based on the additional first input.

The method 1000 can include, at step 1006, receiving a second input via the operator interface device 155. The control system 100, at step 1007 decreases the light intensity of the light emitting from the light system 50 in the one of the starboard direction 31 or the port direction 32 or emitting light in the other of the starboard direction 31 or the port direction 32 based on the second input. The method 1000 can include, at step 1008, receiving an additional second input via the operator interface device 155. The control system 100, at step 1009, increases the light intensity of the light emitting the other of the starboard direction or the port direction based on the additional second input.

Figure 11:
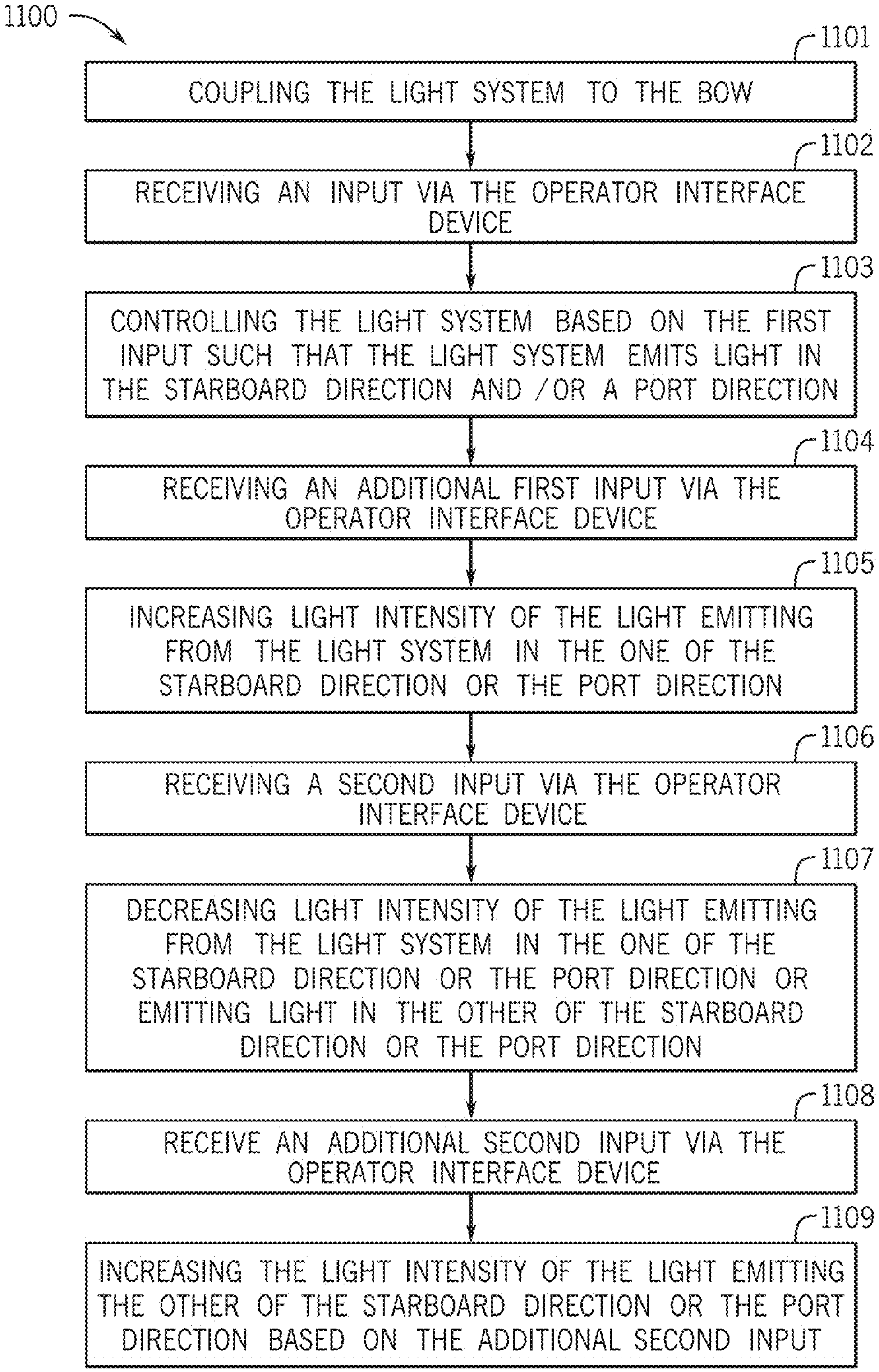

FIG. 11 depicts another example method 1100 according to the present disclosure for operating the marine vessel 10 and/or the light system 50. The method 1100 includes at step 1101 coupling the coupling the light system 50 to the bow 21. The operator interface device 155 receives a first input from the operator at step 1102. At step 1103, the control system 100 controls one of the starboard lights (e.g., the first starboard light 57) to emit light therefrom based on the first input. At step 1104, the control system 100 receives an additional first input via the operator interface device 155 such that at step 1105 the control system 100 controls another one of the starboard lights (e.g., the second starboard light 56) to emit light based on the additional first input.

The method 1100 optionally includes at step 1106 receiving a second input via the operator interface device 155. At step 1107, the control system 100 controls one of the starboard lights (e.g., the second starboard light 56) to stop emitting light therefrom or one of the port lights (e.g., the first port light 59) to emit light therefrom. The method 1100 optionally includes at step 1108 receiving an additional second input via the operator interface device 155. The control system 100 at step 1109 controls another one of the starboard lights (e.g., the first starboard light 57) to stop emitting light therefrom or another one of the port lights (e.g., the second port light 60) to emit light therefrom.

Figure 12:
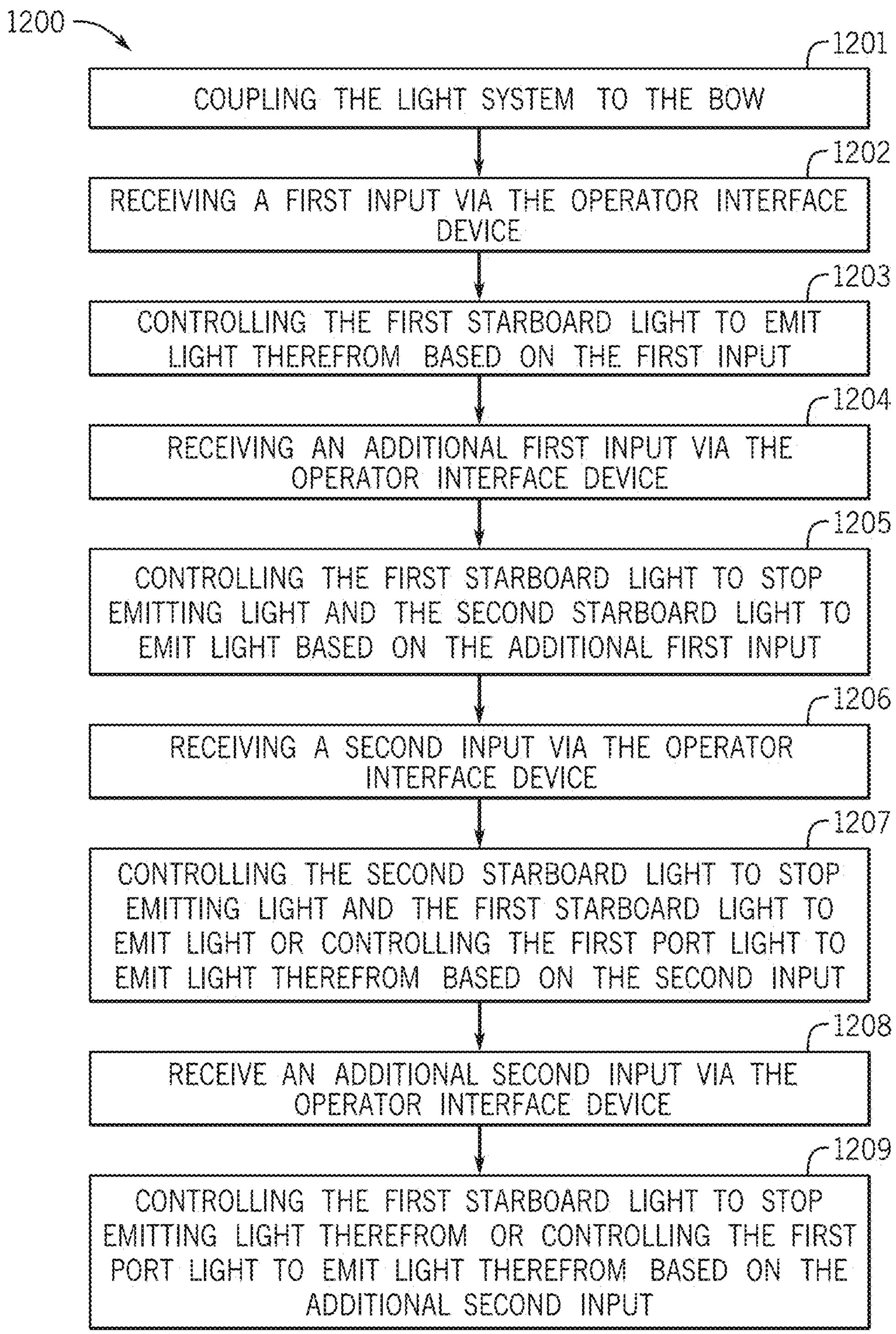

FIG. 12 depicts another example method 1200 according to the present disclosure for operating the marine vessel 10 and/or the light system 50. The method 1200 includes at step 1201 coupling the coupling the light system 50 to the bow 21. The operator interface device 155 receives a first input from the operator at step 1202. At step 1203, the control system 100 controls one of the starboard lights (e.g., the first starboard light 57) to emit light therefrom based on the first input. At step 1204, the control system 100 receives an additional first input via the operator interface device 155. The control system at step 1505 controls the first starboard light 57 to stop emitting light and another one of the starboard lights (e.g., the second starboard light 56) to emit light based on the additional first input.

The method 1200 optionally includes at step 1206 receiving a second input via the operator interface device 155. The control system 100 at step 1207 the second starboard light 56 to stop emitting light and the first starboard light 57 to emit light or controls one of the port lights (e.g., the first port light 59) to emit light therefrom based on the second input. The method 1200 optionally includes at step 1209 receiving an additional second input via the operator interface device 155. The control system 100, at step 1209, controls the first starboard light 57 to stop emitting light therefrom or controls one port lights (e.g., the first port light 59) to emit light therefrom based on the additional second input. In other examples, the control system 100 is configured to control the light system 50 such that a grouping of lights (e.g., lights 55-57, lights 51-57, lights 51, 53, 55, 57) emits light.

In certain examples, the control system 100 can be configured to control and/or be in communication with steering actuator 151 (note that additional information regarding exemplary steering actuators is provided in U.S. Pat. Nos. 7,150,664; 7,255,616; and 7,467,595, which are incorporated by reference herein in their entireties) and associated steering angle sensor 152, and a trim actuator 153 and trim angle sensor 154, each of which may be conventional. In addition, the control system 100 can be configured control and/or be in communication with a steering device 156, such as a steering wheel and/or steering joystick, which may be configured to receive operator inputs in a conventional manner, which subsequently may communicate to other systems of the marine vessel 10 to effectuate steering control over the marine vessel 10. For example, the control system 100 may control steering of one or more marine drives, which is well-known and typically referred to as steer-by-wire arrangements, based on inputs received via the steering device 156. Other steer arrangements, such as steering cable systems arrangements, are well-known in the art and could alternatively be implemented. One or more throttle levers 157 may be configured to receive operator inputs in a conventional manner (also referred to as receiving a requested speed or a demand request), including both a magnitude and a direction for generating thrust, which may be subsequently communicated with the control system 100.

In certain examples, steering-related devices, such as the devices noted above, can be considered an operator interface device 155 which receive inputs and/or provide inputs to control system 100 for operating the light system 50. For instance, the control system 100 can receive inputs from the steering device 156 such that as the steering device is moved in a first direction (e.g., turning at steering wheel in the clockwise direction to thereby turn the marine vessel 10 in the starboard direction) and cause one or more starboard lights 51-57 to emit light thereby illuminating the path the marine vessel 10 is being steered. Similarly, as the steering device is moved in a second direction (e.g., turning at steering wheel in the counterclockwise direction to thereby turn the marine vessel 10 in the port direction) and cause one or more port lights 59-65 to emit light thereby illuminating the path the marine vessel 10 is being steered.

In certain examples, the control system 100 receives inputs from a GPS system 159 configured to determine a current global position of the vessel, track vessel position over time and/or an inertial measurement unit (IMU) or an attitude and heading reference system (AHRS) (collectively shown as the IMU/AHRS 160) to determine vessel speed and/or direction of travel and to provide this information to the control system 100 which may be utilized to operate the light system 50. For example, the control system 100 controls the light system 50 to cause the lights 51-65 to emit light when the marine vessel enters an area based on the GPS input (e.g., the control system 100 causes the lights 51-65 to emit light when the marine vessel 10 enters a marina).

In certain examples, the control system 100 receives inputs from sensors configured to sense marine vessel speed. For example, the control system 100 controls the light system 50 to cause the lights 51-65 to emit light when the speed of the marine vessel 10 is above a predetermined speed threshold.

In certain independent examples, a marine vessel includes a bow, a stern, a port side, and a starboard side laterally spaced apart from the port side. A light system is coupled to the bow or the stern and operable to emit light in a starboard direction and in a port direction from the bow or the stern. An operator interface device configured to receive an input, and a control system is in communication with the operator interface device and configured to control the light system based on the input such that the light system selectively emits light in the starboard direction and/or the port direction.

Optionally a helm located between the bow and the stern and the operator interface device is located at the helm. Optionally the operator interface device is configured to receive a first input such that the light system emits light in the starboard direction and the operator interface device is configured to receive a second input such that the light system emits light in the port direction. Optionally the operator interface device is a joystick and wherein the first input includes moving the joystick in a first direction and the second input includes moving the joystick in a second direction. Optionally the control system is configured to control the light system based on the input such that the light system selectively emits light in a forward direction or a rear direction. Optionally the light system includes a plurality of lights configured to selectively emit light and a plurality of fins interdigitated with the plurality of lights that are configured to direct the light emitted by the plurality of lights. Optionally the light system includes a frame to which the fins in the plurality of fins are stationarily coupled. Optionally the light system includes plurality of lights configured to selectively emit light in the starboard direction and/or the port direction, a port navigation light, and a starboard navigation light, and the plurality of lights are spaced apart from each other and positioned between the port navigation light and the starboard navigation light. Optionally the light system has a frame to which the plurality of lights, the starboard navigation light, and the port navigation light are coupled. Optionally the light system is located in a pocket at the bow or the stern.

In certain independent examples, a method for operating a marine vessel having a bow, a stern, a port side, and a starboard side includes coupling a light system at the bow with the light system operable to emit light in a starboard direction and in a port direction from the bow, receiving, with an operator interface device, an input, and controlling, with a control system, the light system based on the input such that the light system selectively emits light in the starboard direction and/or the port direction.

Optionally, the input is a first input such that the light system emits light in the starboard direction or a second input such that the light system emits light in the port direction. Optionally, the input is a first input and the method includes emitting light in one of the starboard direction or the port direction, receiving an additional first input via the operator interface device, and increasing light intensity of the light emitting from the light system in the one of the starboard direction or the port direction based on the additional first input. Optionally, the method includes receiving a second input via the operator interface device, decreasing the light intensity of the light emitting from the light system in the one of the starboard direction or the port direction or emitting light in the other of the starboard direction or the port direction based on the second input. Optionally, the method includes receiving an additional second input via the operator interface device and increasing light intensity of the light emitting in the other of the starboard direction or the port direction based on the additional second input. Optionally, the light system has a plurality of starboard lights and a plurality of port lights and the input is a first input and the method including controlling one of the starboard lights to emit light based on the first input, receiving an additional first input via the operator interface device; and controlling another one of the starboard lights to emit light based on the additional first input. Optionally, the method includes receiving a second input via the operator interface device and controlling one of the starboard lights to stop emitting light therefrom or emitting light from one of the port lights. Optionally, the method includes receiving an additional second input via the operator interface device and controlling another one of the starboard lights to stop emitting light or emitting light from another one of the port lights. Optionally, the light system has centerline, a plurality of starboard lights each laterally spaced apart from each other in a starboard direction from the centerline, and a plurality of port lights each laterally spaced apart from each other on a port direction from the centerline and the input is a first input, and the method includes controlling a first starboard light of the plurality of starboard lights to emit light therefrom, receiving an additional first input via the operator interface device, controlling the first starboard light to stop emitting light and a second starboard light to emit light therefrom, and the second starboard light is spaced apart in the starboard direction from the centerline more than the first starboard light. Optionally, the method includes receiving a second input via the operator interface device and controlling the second starboard light to stop emitting light and the first starboard light emits light or emitting light from a first port light in the plurality of port lights emits light. Optionally, the method includes receiving an additional second input via the operator interface device and controlling the first starboard light to stop emitting light or emitting light from one of the first port light in the plurality of port lights based on the additional second input.

In certain independent examples, a marine vessel includes a bow, a stern, a port side, and a starboard side laterally spaced apart from the port side. A light system is coupled to the bow and operable to emit light in a starboard direction and in a port direction from the bow. An operator interface device is configured to receive an input, and a control system is in communication with the operator interface device and configured to control the light system based on the input such that the light system selectively emits light in the starboard direction and/or the port direction.

Optionally, a helm is located between the bow and the stern and the operator interface device is located at the helm. Optionally, the operator interface device is configured to receive a first input such that the light system emits light in the starboard direction and the operator interface device is configured to receive a second input such that the light system emits light in the port direction. Optionally, the operator interface device is a joystick and the first input includes moving the joystick in a first direction and the second input includes moving the joystick in a second direction. Optionally, the operator interface device is a touchscreen panel configured to receive the first input and/or the second input. Optionally, the light system includes a plurality of lights configured to selectively emit light. Optionally, the light system includes a plurality of fins interdigitated with the plurality of lights that are configured to direct the light emitted by the plurality of lights. Optionally, the light system includes a frame to which the fins in the plurality of fins are stationarily coupled. Optionally, the light system includes a port navigation light and a starboard navigation light, and the plurality of lights are spaced apart from each other and positioned between the port navigation light and the starboard navigation light. Optionally, the light system has a frame to which the plurality of lights, the starboard navigation light, and the port navigation light are coupled. Optionally, the plurality of lights are located in a pocket at the bow.

In certain independent examples, a marine vessel includes a bow, a stern, a port side, and a starboard side laterally spaced apart from the port side. A light system is coupled to the bow and configured to selectively emit light in a starboard direction and/or a port direction from the bow. An operator interface device is configured to receive an input. A control system is in communication with the operator interface device and configured to control the light system based on the input such that the light system emits light in the starboard direction and/or the port direction.

In certain independent examples, a method for operating a marine vessel having a bow, a stern, a port side, and a starboard side includes coupling a light system at the bow that is configured to selectively emit light, receiving, with an operator interface device, an input, and controlling, with a control system, the light system based on the input such that the light system emits light in a starboard direction and/or a port direction from the bow.

Citations to a number of references are made herein. The cited references are incorporated by reference herein in their entireties. In the event that there is an inconsistency between a definition of a term in the specification as compared to a definition of the term in a cited reference, the term should be interpreted based on the definition in the specification.

In the present description, certain terms have been used for brevity, clarity, and understanding. No unnecessary limitations are to be inferred therefrom beyond the requirement of the prior art because such terms are used for descriptive purposes and are intended to be broadly construed. The different apparatuses, systems, and method steps described herein may be used alone or in combination with other apparatuses, systems, and methods. It is to be expected that various equivalents, alternatives, and modifications are possible within the scope of the appended claims.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein may be in the form of a functional diagram, operational sequence, or flow diagram, and may be described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology may be required for a novel implementation.

This written description uses examples to disclose the invention and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A marine vessel comprising:

a bow, a stern, a port side, and a starboard side;

a light system coupled to the bow or the stern and operable to emit light therefrom;

an operator interface device configured to receive one or more inputs for steering the marine vessel along a path; and a control system in communication with the operator interface device and configured to control the light system based on the one or more inputs such that the light system illuminates the path by emitting light in a starboard direction, a port direction, a forward direction, and/or a rear direction as the marine vessel is steered along the path.

2. The marine vessel according to claim 1, wherein the light system includes a plurality of lights with each light in the plurality of lights configured to selectively emit light based on the one or more inputs for steering the marine vessel along the path.

3. The marine vessel according to claim 1, wherein the operator interface device is configured to receive a first input such that the light system emits light in the starboard direction; and wherein the operator interface device is configured to receive a second input such that the light system emits light in the port direction.

4. The marine vessel according to claim 3, wherein the operator interface device is a steering device and wherein the first input includes moving the steering device in a first direction and the second input includes moving the joystick steering device in a second direction.

5. The marine vessel according to claim 1, wherein the control system is further configured to receive inputs from a GPS system and control the light system to emit light from the light system when the marine vessel enters a select area.

6. The marine vessel according to claim 1, wherein the light system includes a plurality of lights configured to selectively emit light in the starboard direction and/or the port direction, a port navigation light, and a starboard navigation light, and wherein the plurality of lights are positioned between the port navigation light and the starboard navigation light.

7. The marine vessel according to claim 1, wherein the light system is located in a pocket at the bow or the stern.

8. A marine vessel comprising:

a bow, a stern, a port side, and a starboard side;

a light system coupled to the bow or the stern and operable to emit light in a starboard direction and/or in a port direction from the bow or the stern;

an operator interface device configured to receive an input; and a control system in communication with the operator interface device and configured to control the light system based on the input such that the light system selectively emits light in the starboard direction and/or the port direction; and wherein the light system includes a plurality of lights configured to selectively emit light and a plurality of fins interdigitated with the plurality of lights that are configured to direct the light emitted by the plurality of lights.

9. The marine vessel according to claim 8, wherein the light system includes a frame to which the fins in the plurality of fins are stationarily coupled.

10. A marine vessel comprising:

a bow, a stern, a port side, and a starboard side;

a light system coupled to the bow or the stern and operable to emit light in a starboard direction and/or in a port direction from the bow or the stern;

an operator interface device configured to receive an input, and a control system in communication with the operator interface device and configured to control the light system based on the input such that the light system selectively emits light in the starboard direction and/or the port direction; and wherein the light system includes a plurality of lights configured to selectively emit light in the starboard direction and/or the port direction, a port navigation light, and a starboard navigation light, and wherein the plurality of lights are positioned between the port navigation light and the starboard navigation light; and wherein the light system has a frame to which the plurality of lights, the starboard navigation light, and the port navigation light are coupled.

11. A method for operating a marine vessel having a bow, a stern, a port side, and a starboard side, the method comprising:

coupling a light system at the bow or the stern, the light system operable to emit light therefrom;

receiving, with an operator interface device, one or more inputs for steering the marine vessel along a path; and controlling, with a control system, the light system based on the one or more inputs such that the light system illuminates the path by emitting light in a starboard direction, the port direction, a forward direction, and/or a rear direction as the marine vessel is steered along the path.

12. The method according to claim 11, wherein the one of the inputs is a first input such that the light system emits light in the starboard direction or one of the inputs is a second input such that the light system emits light in the port direction.

13. The method according to claim 11, wherein one of the inputs is a first input, and further comprising:

emitting light in one of the starboard direction or the port direction;

receiving an additional first input via the operator interface device; and increasing light intensity of the light emitting from the light system in the one of the starboard direction or the port direction based on the additional first input.

14. The method according to claim 13, further comprising:

receiving a second input via the operator interface device; and decreasing the light intensity of the light emitting from the light system in the one of the starboard direction or the port direction or emitting light in the other of the starboard direction or the port direction based on the second input.

15. The method according to claim 14, further comprising:

receiving an additional second input via the operator interface device; and increasing light intensity of the light emitting in the other of the starboard direction or the port direction based on the additional second input.

16. The method according to claim 11, wherein the light system has a plurality of starboard lights and a plurality of port lights and one of the inputs is a first input; and further comprising:

controlling one of the starboard lights to emit light based on the first input;

receiving an additional first input via the operator interface device; and controlling another one of the starboard lights to emit light based on the additional first input.

17. The method according to claim 16, further comprising:

receiving a second input via the operator interface device; and controlling one of the starboard lights to stop emitting light therefrom or emitting light from one of the port lights.

18. The method according to claim 17, further comprising:

receiving an additional second input via the operator interface device; and controlling another one of the starboard lights to stop emitting light or emitting light from another one of the port lights.

19. The method according to claim 11, wherein the light system has centerline, a plurality of starboard lights each laterally spaced apart from each other in a starboard direction from the centerline, and a plurality of port lights each laterally spaced apart from each other in a port direction from the centerline; wherein one of the inputs is a first input; and further comprising:

controlling a first starboard light of the plurality of starboard lights to emit light therefrom;

receiving an additional first input via the operator interface device;

controlling the first starboard light to stop emitting light and a second starboard light of the plurality of starboard lights to emit light therefrom; and wherein the second starboard light is spaced apart in the starboard direction from the centerline more than the first starboard light.

20. The method according to claim 19, further comprising:

receiving a second input via the operator interface device; and controlling the second starboard light to stop emitting light and the first starboard light emits light or emitting light from a first port light in the plurality of port lights emits light.

* * * * *